(12) United States Patent
Ozaki et al.

(10) Patent No.: US 12,358,476 B2
(45) Date of Patent: Jul. 15, 2025

(54) VEHICLE TRAVEL CONTROL DEVICE

(71) Applicant: TOYOTA JIDOSHA KABUSHIKI KAISHA, Toyota (JP)

(72) Inventors: Shoji Ozaki, Toyota (JP); Ryosuke Ochiai, Toyota (JP); Fumiaki Saito, Susono (JP); Masahiro Hara, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 133 days.

(21) Appl. No.: 18/482,095

(22) Filed: Oct. 6, 2023

(65) Prior Publication Data

US 2024/0208472 A1 Jun. 27, 2024

(30) Foreign Application Priority Data

Dec. 27, 2022 (JP) ................................. 2022-209194

(51) Int. Cl.
*B60T 8/176* (2006.01)
*B60T 8/171* (2006.01)
*B60T 8/172* (2006.01)
*B60T 8/1761* (2006.01)

(52) U.S. Cl.
CPC .......... *B60T 8/17616* (2013.01); *B60T 8/171* (2013.01); *B60T 8/172* (2013.01); *B60T 8/1761* (2013.01); *B60T 2240/00* (2013.01); *B60T 2250/04* (2013.01); *B60T 2270/10* (2013.01); *B60T 2270/416* (2013.01)

(58) Field of Classification Search
CPC ...... B60T 8/17616; B60T 8/171; B60T 8/172; B60T 8/1761; B60T 2240/00; B60T 2250/04; B60T 2270/10; B60T 2270/416
See application file for complete search history.

(56) References Cited

U.S. PATENT DOCUMENTS 4,566,737 A * 1/1986 Masaki ............... B60T 8/17616
188/181 C
5,570,935 A * 11/1996 Monzaki ............. B60T 8/17636
303/155

(Continued)

FOREIGN PATENT DOCUMENTS

JP S60-050061 A 3/1985

*Primary Examiner* — Phutthiwat Wongwian
*Assistant Examiner* — Susan E Scharpf
(74) *Attorney, Agent, or Firm* — SoraIP, Inc.

(57) ABSTRACT

A vehicle travel control device includes a plurality of wheel speed detection devices and a control unit. A plurality of wheel speed detection devices detects the wheel speed of each of the plurality of wheels. The control unit performs vehicle travel control (anti-skid control) based on the wheel speed detected by the wheel speed detection device. The control unit determines whether the wheel speed of the first wheel is abnormal based on the relationship between the wheel speed of the first wheel with the highest wheel speed and the wheel speed of the second wheel with the second highest wheel speed. Abnormality determination is performed to determine whether there is. When the vehicle is braking, the control unit does not make an abnormality determination when the wheel speed increase rate of the first wheel is less than the increase rate reference value.

5 Claims, 4 Drawing Sheets

(56) References Cited

U.S. PATENT DOCUMENTS

| | | | | |
|---|---|---|---|---|
| 5,612,879 | A * | 3/1997 | Makino | B60T 8/17616 |
| | | | | 702/148 |
| 6,170,923 | B1 * | 1/2001 | Iguchi | G01P 21/02 |
| | | | | 303/122.04 |
| 6,364,427 | B1 * | 4/2002 | Ohtsu | B60T 8/173 |
| | | | | 303/3 |
| 2011/0095599 | A1 * | 4/2011 | Watanabe | B60T 8/1706 |
| | | | | 303/137 |
| 2014/0046532 | A1 * | 2/2014 | Saito | B60T 8/88 |
| | | | | 701/30.4 |
| 2021/0213922 | A1 * | 7/2021 | Suzuki | B60T 8/3225 |
| 2024/0208472 | A1 * | 6/2024 | Ozaki | B60T 8/172 |

\* cited by examiner

VEHICLE TRAVEL CONTROL DEVICE

CROSS-REFERENCE TO RELATED APPLICATION

This application claims priority to Japanese Patent Application No. 2022-209194 filed on Dec. 27, 2022, incorporated herein by reference in its entirety.

BACKGROUND

1. Technical Field

The present disclosure relates to a travel control device for vehicles such as automobiles.

2. Description of Related Art

In a vehicle in which anti-skid control is performed as vehicle travel control, an estimated vehicle body speed for computing a braking slip rate is set based on the highest wheel speed of a plurality of wheel speeds. When the highest wheel speed becomes excessively high because of a load shift etc. accompanying deceleration and turning of the vehicle, the estimated vehicle body speed also becomes excessively high. Thus, the estimated vehicle body speed is corrected so as not to be excessively high.

For example, Japanese Unexamined Patent Application Publication No. 60-050061 (JP 60-050061 A) describes an anti-skid control method. When the difference between the highest wheel speed of the right and left front wheel speeds and the rear wheel speeds and the middle wheel speed is equal to or greater than a reference value, the estimated vehicle body speed is changed to a value obtained by subtracting a predetermined wheel speed from the middle wheel speed.

A wheel speed is detected by a wheel speed sensor provided for each wheel. The wheel speed sensor includes a detection unit that generates a pulse signal that is proportional to the rotational speed of the wheel, and an electronic control device that computes a wheel speed based on the pulse signal and outputs a signal that indicates the wheel speed. When an abnormality occurs in an electronic circuit etc. of the electronic control device, the wheel speed indicated by the signal output from the wheel speed sensor may become excessively high.

When the above-described event occurs, the detected wheel speed changes more significantly than the incremental change due to a load shift etc. accompanying deceleration and turning of the vehicle. In the anti-skid control method described in JP 60-050061 A, the rate of increase in the wheel speed is not taken into consideration, and therefore it is not possible to determine an abnormality in the wheel speed due to an abnormality of the wheel speed sensor. In addition, it is not possible to avoid making an unnecessary determination as to whether the wheel speed is abnormal.

SUMMARY

The present disclosure provides a travel control device that performs travel control for a vehicle based on a wheel speed. When there occurs an abnormality in which a wheel speed becomes excessively high, the travel control device can determine the abnormality and avoid making an unnecessary determination of the wheel speed.

The present disclosure provides a vehicle travel control device (10) including:

a plurality of wheel speed detection devices (wheel speed sensors 44FL to 44RR) that detects a wheel speed (Vwi) of each of a plurality of wheels (14FL to 14RR); and a control unit (travel control ECU 10) that performs travel control for a vehicle based on the wheel speed detected by the wheel speed detection devices.

The control unit (travel control ECU 10) is configured to perform an abnormality determination (S30) to determine whether a wheel speed (Vwmax) of a first wheel having a highest wheel speed is abnormal based on a relationship between the wheel speed of the first wheel and a wheel speed (Vwmh) of a second wheel having a second highest wheel speed.

Further, the control unit is configured not to perform the abnormality determination when a rate of increase in the wheel speed of the first wheel is less than an increase rate reference value (S20) while the vehicle (16) is braked.

When there occurs an abnormality such as an abnormality in an electronic circuit of the wheel speed detection device, the wheel speed detected by the wheel speed detection device may become excessively high. In that case, the relationship between the wheel speed of the first wheel and the wheel speed of the second wheel is different from that during normal times. Hence, it is possible to determine whether the wheel speed of the first wheel is abnormal based on the relationship between the wheel speed of the first wheel and the wheel speed of the second wheel.

According to the above configuration, it is determined whether the wheel speed of the first wheel having the highest wheel speed is abnormal based on the relationship between the wheel speed of the first wheel and the wheel speed of the second wheel having the second highest wheel speed. Hence, it is possible to determine an abnormality in which the wheel speed of the first wheel becomes excessively high because of an abnormality such as an abnormality in the electronic circuit of the wheel speed detection device when such an abnormality occurs.

According to the above configuration, in addition, the abnormality determination is not performed when the rate of increase in the wheel speed of the first wheel is less than the increase rate reference value while the vehicle is braked. Thus, it is possible to suppress an unnecessary determination being made in a situation in which the rate of increase in the wheel speed of the first wheel is less than the increase rate reference value. It is possible to suppress an erroneous determination that the wheel speed of the first wheel is abnormal.

In another aspect of the present disclosure, the control unit (travel control ECU 10) may be configured to determine that the wheel speed (Vwmax) of the first wheel is abnormal when a ratio of the wheel speed of the first wheel to the wheel speed (Vwmh) of the second wheel exceeds an abnormality determination reference value (1/Ka).

When there occurs an abnormality such as an abnormality in the electronic circuit of the wheel speed detection device and the wheel speed of the first wheel becomes excessively high, the ratio of the wheel speed of the first wheel to the wheel speed of the second wheel becomes higher than that during normal times. Hence, it is possible to determine whether the wheel speed of the first wheel is abnormal based on the ratio of the wheel speed of the first wheel to the wheel speed of the second wheel.

According to the above aspect, it is determined that the wheel speed of the first wheel is abnormal when the ratio of the wheel speed of the first wheel to the wheel speed of the second wheel exceeds the abnormality determination reference value. Hence, it is possible to determine an abnormality in which the wheel speed of the first wheel becomes excessively high because of an abnormality such as an abnormality in the electronic circuit of the wheel speed detection device when such an abnormality occurs.

In one aspect of the present disclosure, the control unit (travel control ECU 10) may be configured to compute an estimated vehicle body speed (Vvba) of the vehicle based on the wheel speed (Vwmax) of the first wheel (S260) when it is not determined that the wheel speed of the first wheel is abnormal and while the vehicle (16) is braked, and perform anti-skid control as the travel control using the estimated vehicle body speed.

According to the above aspect, an estimated vehicle body speed of the vehicle is computed based on the wheel speed of the first wheel when it is not determined that the wheel speed of the first wheel is abnormal and while the vehicle is braked. Anti-skid control is performed as the travel control using the estimated vehicle body speed. Hence, braking slip can be reduced by the anti-skid control when excessive braking slip occurs in wheels other than the first wheel.

In another aspect of the present disclosure, further, the control unit (travel control ECU 10) may be configured to limit an increase in the estimated vehicle body speed (Vvba) at a limit increase rate (Kbu) (S260).

According to the above aspect, an increase in the estimated vehicle body speed is limited at the limit increase rate. Hence, it is possible to suppress an abrupt increase in the estimated vehicle body speed even when there occurs an abnormality such as an abnormality in the electronic circuit of the wheel speed detection device and the wheel speed of the first wheel abruptly becomes high.

In another aspect of the present disclosure, further, the control unit (travel control ECU 10) may be configured to compute an estimated vehicle body speed (Vvba) of the vehicle based on the wheel speed (Vwmh) of the second wheel when it is determined that the wheel speed (Vwmax) of the first wheel is abnormal and while the vehicle (16) is braked, and limit a reduction in the estimated vehicle body speed at a limit reduction rate (Kbd) (S260).

According to the above aspect, an estimated vehicle body speed of the vehicle is computed based on the wheel speed of the second wheel when it is determined that the wheel speed of the first wheel is abnormal. A reduction in the estimated vehicle body speed is limited at the limit reduction rate. Hence, it is possible to suppress the estimated vehicle body speed becoming an excessively high value even when there occurs an abnormality such as an abnormality in the electronic circuit of the wheel speed detection device and the wheel speed of the first wheel abruptly becomes high. In addition, it is possible to suppress an abrupt reduction in the estimated vehicle body speed when a transition is made from a situation in which the estimated vehicle body speed is computed based on the wheel speed of the first wheel to a situation in which the estimated vehicle body speed is computed based on the wheel speed of the second wheel. This can suppress the anti-skid control being performed inappropriately.

Other objects, other features, and incidental advantages of the present disclosure will be easily understood from the description of an embodiment of the present disclosure made while referring to the following drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described in detail below with reference to the accompanying drawings.

Figure 1:
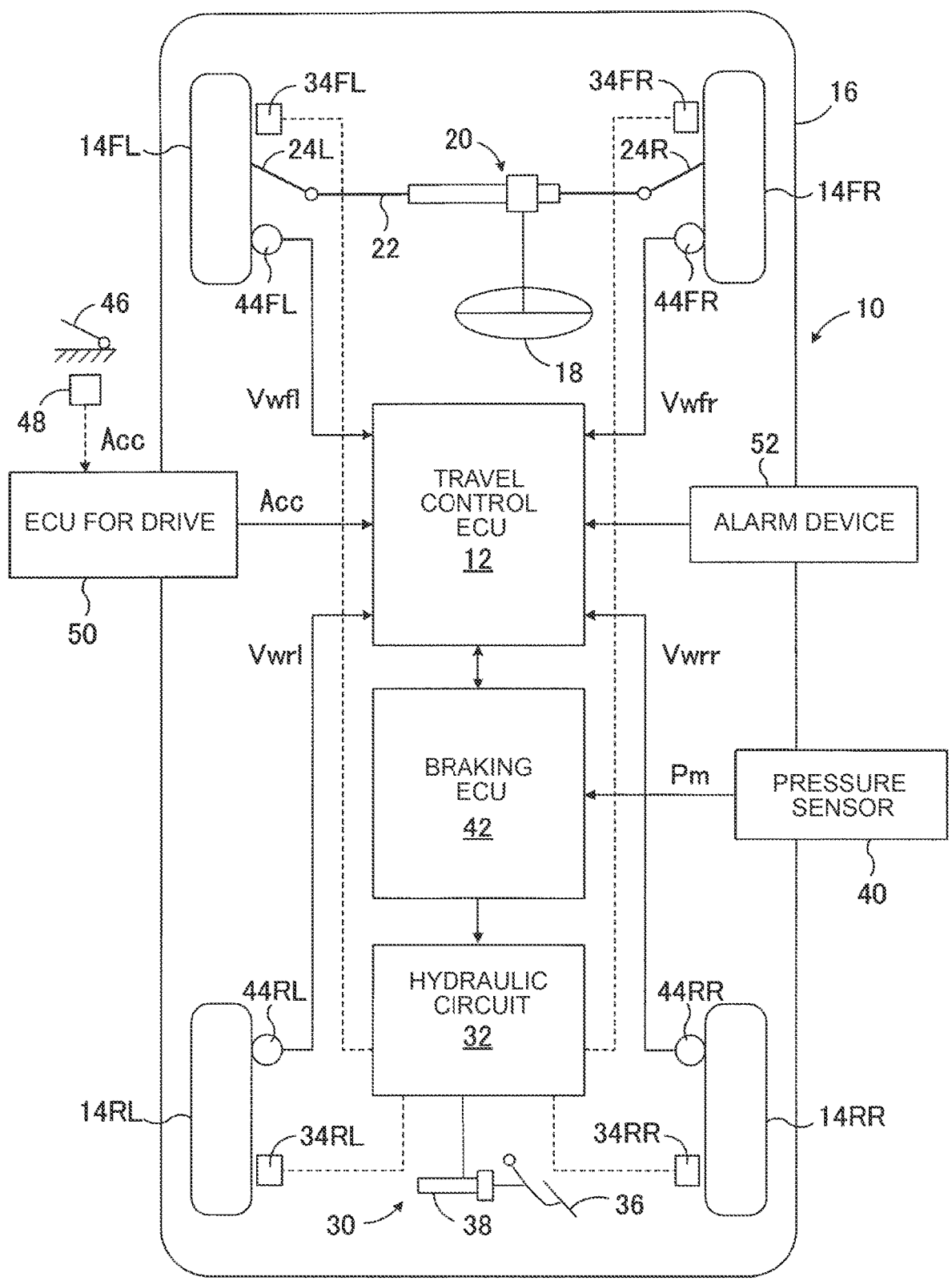
FIG. 1 is a schematic configuration diagram showing an embodiment of a vehicle travel control device according to the present disclosure.

A vehicle travel control device 10 according to the embodiment shown in FIG. 1 is applied to a vehicle 16 having a travel control electronic control unit 12 and wheels 14FL, 14FR, 14RL and 14RR. In the embodiment, the left and right front wheels 14FL and 14FR are steering wheels and driving wheels. The left and right rear wheels 14RL and 14RR are non-steering wheels and driven wheels. The front wheels 14FL and 14FR are steered via a rack bar 22 and tie rods 24L and 24R by an electric power steering device 20 driven in response to manipulation of a steering wheel 18 by a driver. In the following description, the electronic control unit is called an ECU (abbreviation for Electronic Control Unit).

The vehicle 16 has a braking device 30 that applies braking force to the wheels 14FL-14RR. The braking device 30 includes a hydraulic circuit 32, wheel cylinders 34FR, 34FL, 34RR and 34RL provided for the wheels 14FL-14RR, and a master cylinder 38 for pumping brake oil in response to the driver's depression of the brake pedal 36. Although not shown in detail in FIG. 1, hydraulic circuit 32 includes a reservoir, an oil pump, various valve devices, etc., and functions as a brake actuator.

The braking device 30 applies braking force proportional to the pressure of the wheel cylinders 34FL-34RR to the wheels 14FL-14RR, respectively. The pressure of the wheel cylinders 34FL-34RR is normally controlled according to the pressure in the master cylinder 38 (master cylinder pressure Pm) driven in response to the depression of the brake pedal 36 by the driver. That is, the pressure sensor 40 detects the master cylinder pressure Pm. The braking ECU 42 controls the pressure of each wheel cylinder 34FL-34RR based on the master cylinder pressure Pm. Further, the pressure of each wheel cylinder 34FL-34RR is controlled regardless of the amount of depression of the brake pedal 36 by the driver by controlling the oil pump and various valve devices by the braking ECU 42 as necessary.

The wheels 14FL, 14FR, 14RL and 14RR have wheel speed sensors 44FL, 44FR, 44RL and 44RR functioning as wheel speed detection devices for detecting the wheel speed Vwi (i=fl, fr, rl and rr) of the corresponding wheels, respectively. A signal indicating the wheel speed Vwi detected by the wheel speed sensors 44FL, 44FR, 44RL and 44RR is input to the ECU 12 for travel control.

Although not shown in FIG. 1, the vehicle 16 has an engine as a driving device that applies driving force to the left and right front wheels 14FL and 14FR, which are driving wheels. The amount of depression of the accelerator pedal 46 by the driver is detected by an accelerator operation amount sensor 48 as the accelerator operation amount Acc. The output of the engine is normally controlled by the drive ECU 50 based on the accelerator operation amount Acc. The output of the engine is controlled independently of the accelerator operation amount Acc as required. The driving device may be any device capable of applying a driving force to the driving wheels, such as an electric motor or a hybrid system. The driving wheels may be left and right rear wheels 14RL and 14RR, or four wheels 14FL-14RR.

Each ECU has a microcomputer as a main part. The microcomputer includes CPU, ROM, RAM, readable/writable nonvolatile memory (N/M), interface (I/F), and the like. The CPU implements various functions by executing instructions (programs, routines) stored in the ROM. Further, these ECUs are connected to each other via a Controller Area Network (CAN) so as to be able to exchange data (communicate). Therefore, detected values of sensors (including switches) connected to a specific ECU are transmitted to other ECUs as well.

The travel control ECU 12 and the braking ECU 42 cooperate with each other to function as a control unit that performs anti-skid control (hereinafter referred to as "ABS control") as vehicle traveling control based on the wheel speed. When the vehicle is braking, the travel control ECU 12 calculates an estimated vehicle body speed Vvba of the vehicle 16 based on the maximum wheel speed Vwmax among the wheel speeds Vwfl, Vwfr, Vwrl and Vwrr. Further, the travel control ECU 12 limits the increase/decrease change of the estimated vehicle body speed Vvba so that the estimated vehicle body speed Vvba does not excessively increase/decrease. The travel control ECU 12 determines that the vehicle is being braked when the master cylinder pressure Pm is equal to or higher than a reference value or when a brake lamp switch (not shown) is turned on.

The braking ECU 42 calculates a braking slip ratio Sbi of the wheels 14FL-14RR according to the following equation (1) based on the wheel speed Vwi and the estimated vehicle body speed Vvba. Further, when the braking slip ratio Sbi of any wheel exceeds the control start reference value Sbc (positive constant), the braking ECU 42 maintains the braking slip ratio of that wheel until a preset control end condition is satisfied. The braking force is controlled in a manner known in the art such that is within a predetermined range.

In particular, the travel control ECU 12 determines the first wheel speed based on the relationship between the wheel speed Vwmax of the first wheel having the highest wheel speed and the wheel speed Vwmh of the second wheel having the second highest wheel speed. Abnormality determination is performed to determine whether the wheel speed of the wheel is abnormal. When the travel control ECU 12 determines that the increase rate of the wheel speed Vwmax of the first wheel is equal to or greater than a preset increase rate reference value Vwdc (positive constant) when the vehicle is being braked; allow the wheel speed abnormality determination of the first wheel. Therefore, when the rate of increase of the wheel speed Vwmax of the first wheel is less than the rate-of-increase reference value Vwdc, the abnormality determination of the wheel speed of the first wheel is not permitted. The rate-of-increase reference value Vwdc is set to a positive constant that cannot be obtained when the vehicle is running.

In the embodiment, the travel control ECU 12 determines that the ratio of the wheel speed Vwmax of the first wheel to the wheel speed Vwmh of the second wheel exceeds the abnormality determination reference value (positive constant) for a predetermined time or more. When it is determined that it continues, it is determined that the wheel speed of the first wheel is abnormal. When the travel control ECU 12 determines that the wheel speed of the first wheel is abnormal, it activates the alarm device 52 to warn the occupants of the vehicle that the wheel speed of the first wheel is abnormal.

When the travel control ECU 12 determines that the wheel speed of the first wheel is abnormal, it calculates an estimated vehicle body speed Vvba of the vehicle 16 based on the wheel speed Vwmh of the second wheel. Furthermore, the travel control ECU 12 limits the increase/decrease change of the estimated vehicle body speed Vvba so that the estimated vehicle body speed Vvba does not excessively increase/decrease.

Further, the travel control ECU 12 and the drive ECU 50 cooperate with each other to function as a control unit that performs traction control (hereinafter referred to as "TRC control") as another travel control of the vehicle. When the vehicle is being driven, the travel control ECU 12 controls the vehicle 16 based on the smaller wheel speed Vwd of the wheel speeds Vwrl and Vwrr of the left and right rear wheels 14RL and 14RR, which are driven wheels. to calculate the estimated vehicle speed Vvda. Furthermore, the travel control ECU 12 limits the increase/decrease change of the estimated vehicle body speed Vvda so that the estimated vehicle body speed Vvda does not excessively increase/decrease.

The drive ECU 50 calculates the drive slip ratio Sdi of the drive wheels according to the following equation (2) based on the wheel speed Vwi and the estimated vehicle body speed Vvda. Further, when the drive slip ratio Sdi of any of the drive wheels exceeds the control start reference value Sdc (positive constant), the drive ECU 50 keeps the drive slip of the wheel until a preset control end condition is satisfied. Braking force is controlled in a manner known in the art such that the rate is within a predetermined range of values.

$$Sbi = (Vvba - Vwi)/Vvba \quad (1)$$

$$Sdi = (Vwi - Vvda)/Vvda \quad (2)$$

Note that when it is determined that the wheel speed of the first wheel is abnormal while the vehicle is being driven, the drive slip ratio of the first wheel becomes an abnormal value. No braking force is applied to the first wheel by TRC control.

Figure 2:
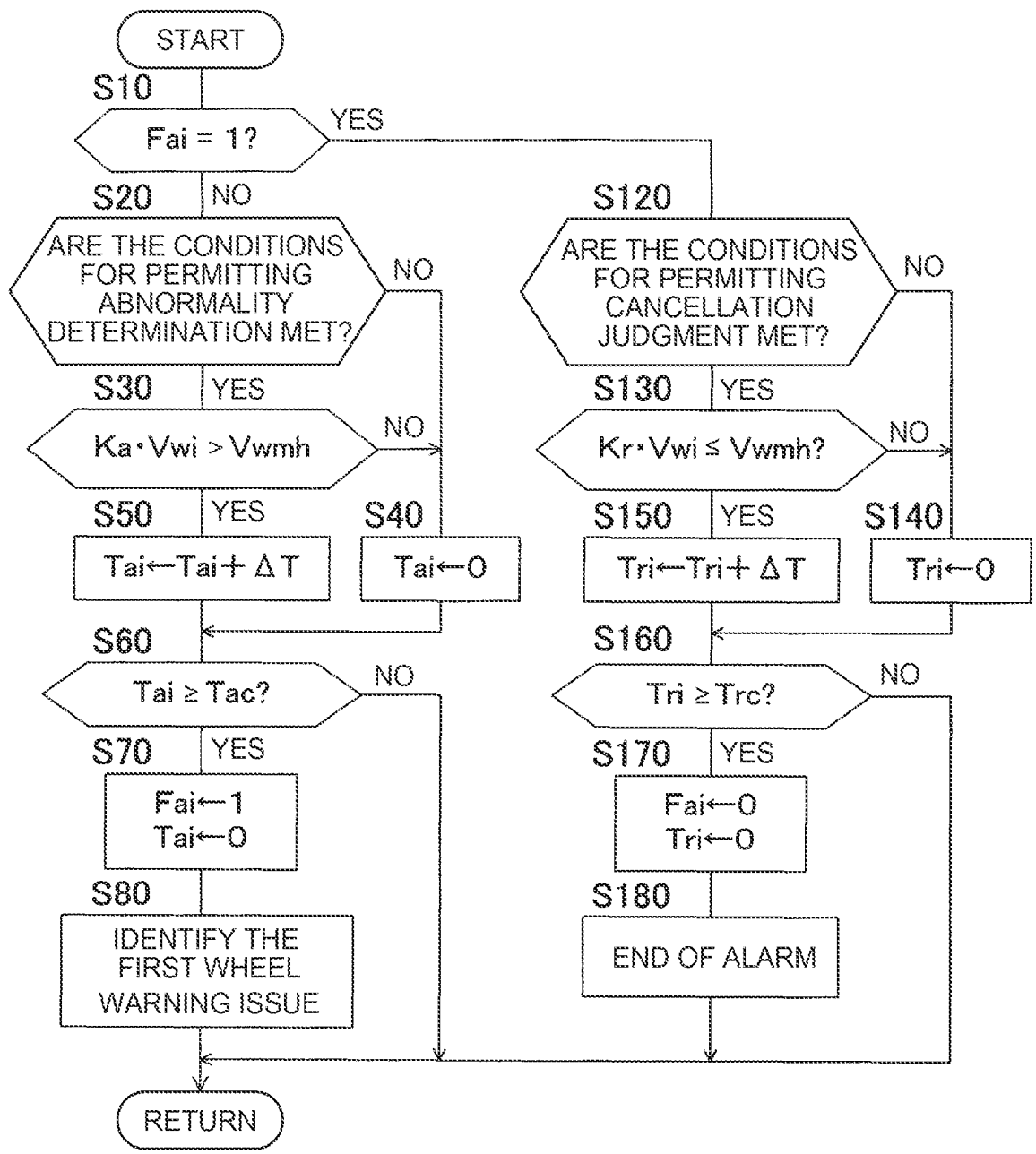
FIG. 2 is a flowchart showing a control routine for abnormality determination in the embodiment.

In the embodiment, the ROM of the travel control ECU 12 stores a control program corresponding to the flowchart shown in FIG. 2. The CPU of the travel control ECU 12 performs abnormality determination control for the wheel speed of the first wheel according to this program. Furthermore, the ROM of the travel control ECU 12 stores a control program corresponding to the flowchart shown in FIG. 3. The CPU of the travel control ECU 12 performs calculation control of the estimated vehicle body speeds Vvba and Vvda according to this program.

Abnormal Judgment Control

Next, an abnormality determination control routine in the embodiment will be described with reference to the flowchart shown in FIG. 2. The control according to the flowchart shown in FIG. 2 is repeatedly executed every predetermined time $\Delta T$ when an ignition switch (not shown) is turned on. In particular, S10 to S80 are executed for each wheel in the order of the left front wheel (i=fl), the right front wheel (i=fr), the left rear wheel (i=rl) and the right rear wheel (i=rr), for example. S130-S170 are performed for the first wheel, i.e. the wheel with the highest wheel speed.

In the following description, the control according to the flowchart shown in FIG. 2 is simply referred to as "determination control". Prior to the start of determination control, a flag Fai indicating whether the wheel speed of the first wheel is abnormal is reset to 0 (not abnormal).

First, in step 10, the CPU determines whether the flag Fai is 1, that is, whether the wheel speed of the first wheel is abnormal. When the CPU makes an affirmative determination, it advances determination control to S120. When the CPU makes a negative determination, it advances determination control to S20.

In S20, the CPU determines whether or not the condition for permitting the abnormality determination of whether the wheel speed of the first wheel is abnormal is satisfied. When the CPU makes a negative determination, it advances determination control to S40. When the CPU makes an affirmative determination, it advances determination control to S30.

If the vehicle 16 is not being braked, it is determined that the conditions for permitting abnormality determination are satisfied when the vehicle is traveling straight ahead. In this case, when the smallest wheel speed Vwmin or the estimated vehicle body speed Vvba among the wheel speeds Vwfl, Vwfr, Vwrl and Vwrr is equal to or greater than the reference value Vwrc (positive constant) for determining whether the vehicle is running, it may be determined that the vehicle is running. Further, it may be determined that the vehicle is traveling straight when the ratio of the wheel speeds of the left and right wheels is within the reference range.

Further, when the vehicle 16 is braking, when the rate of increase of the wheel speed Vwmax of the first wheel is equal to or greater than the rate-of-increase reference value Vwdc and the vehicle is in a straight running state, the condition for permitting abnormality determination is determined to be established. In this case, when the amount of increase $\Delta Vwmax$ from the previous time in the wheel speed Vwmax of the first wheel is equal to or greater than the increase reference value $\Delta Vwc$ (positive constant), the rate of increase of the wheel speed Vwmax of the first wheel is the increase rate reference value. It may be determined that the above is the case.

In S30, the CPU determines whether $Ka \cdot Vwi$ is greater than the wheel speed Vwmh of the second wheel, where Ka is a constant positive coefficient less than 1, such as 0.8, i.e., whether the ratio of the wheel speed Vwi of the relevant wheel to the wheel speed Vwmh of the second wheel exceeds the abnormality determination reference value 1/Ka. When the CPU makes a negative determination, it resets the count value Tai of the abnormality determination timer to 0 in S40. When the determination is affirmative, the CPU counts up the count value Tai of the abnormality determination timer by $\Delta T$ in S50.

In S60, the CPU determines whether the count value Tai of the abnormality determination timer is greater than or equal to the reference value Tac (a positive constant of about one second). When the CPU makes a negative determination, it once ends the determination control. When the CPU makes an affirmative determination, it advances determination control to S70.

In S70, the CPU determines that the wheel speed of the first wheel is abnormal, sets the flag Fai to 1, and stores information indicating that the flag Fai is 1 in the nonvolatile memory. Furthermore, the CPU resets the count value Tai of the abnormality determination timer to zero.

In S80, the CPU identifies which of the wheels 14FL, 14FR, 14RL and 14RR the first wheel is based on i. Furthermore, the CPU issues an alarm that the wheel speed of the first wheel is abnormal by activating the alarm device 52.

In S120, the CPU determines whether or not a cancellation determination permission condition for canceling the determination that the wheel speed of the first wheel is abnormal is satisfied. When the CPU makes a negative determination, it advances determination control to S140. When the CPU makes an affirmative determination, it advances determination control to S130. Note that, as in S20, when the CPU determines that the condition for permitting abnormality determination as to whether the wheel speed of the first wheel is abnormal is met, the CPU performs a cancellation determination for canceling the abnormality determination. is determined to be satisfied.

In S130, the CPU whether $Kr \cdot Vwi$ is less than or equal to the wheel speed Vwmh of the second wheel, with Kr as a constant positive coefficient smaller than 1 and larger than Ka, about 0.955. It is determined whether the ratio of the wheel speed Vwi of the relevant wheel to the wheel speed Vwmh of the second wheel is equal to or less than the release determination reference value 1/Kr. When the CPU makes a negative determination, it resets the count value Tri of the timer for cancellation determination to 0 in S140. When the determination is affirmative, the CPU counts up the count value Tri of the abnormality determination timer by $\Delta T$ in S150.

In S160, the CPU determines whether the count value Tri of the release determination timer is greater than or equal to the reference value Trc (a positive constant of about one second). When the CPU makes a negative determination, it once ends the determination control. When the CPU makes an affirmative determination, it advances determination control to S170.

In S170, the CPU determines that the wheel speed of the first wheel is normal, resets the flag Fai to 0, and deletes information indicating that the flag Fai is 1 from the nonvolatile memory. Furthermore, the CPU resets the count value Tri of the timer for cancellation determination to zero.

At S180, the CPU terminates the issuance of the warning that the wheel speed of the first wheel is abnormal by canceling the operation of the alarm device 52.

Arithmetic Control of Estimated Vehicle Speed

Figure 3:
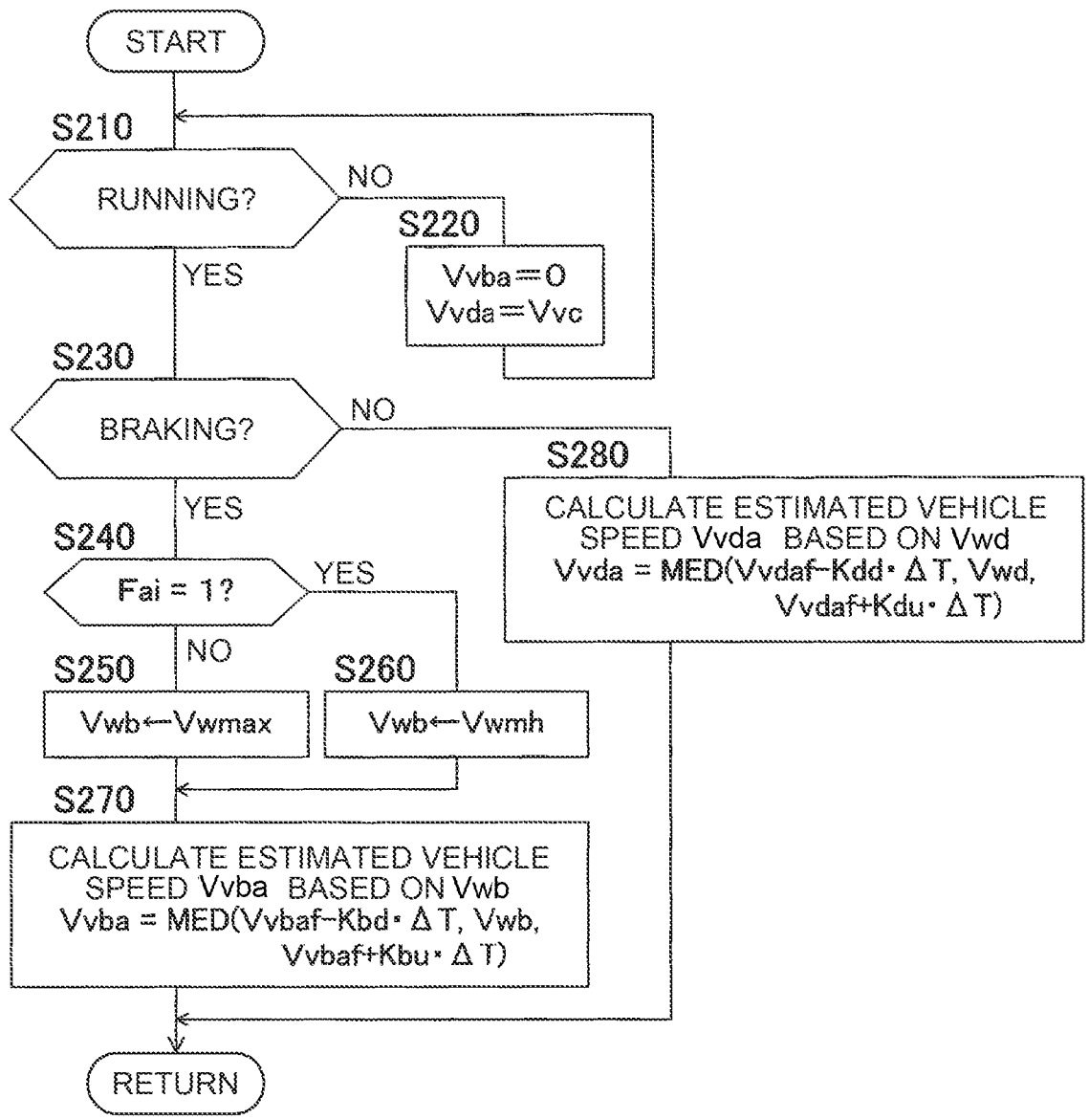
FIG. 3 is a flowchart showing a routine for calculating and controlling an estimated vehicle body speed in the embodiment.

Next, an arithmetic control routine for the estimated vehicle body speeds Vvba and Vvda in the embodiment will be described with reference to the flowchart shown in FIG. 3. The control according to the flowchart shown in FIG. 3 is repeatedly executed at predetermined time intervals when an ignition switch (not shown) is turned on. In the following description, the control according to the flowchart shown in FIG. 3 is simply referred to as "arithmetic control".

First, in S210, the CPU determines whether the vehicle 16 is running. When the CPU makes an affirmative determination, it advances the arithmetic control to S230. When the CPU makes a negative determination, it sets the estimated vehicle body speed Vvba to 0 and sets the estimated vehicle body speed Vvda to a positive constant Vvc close to 0 in S220. Note that the estimated vehicle speed Vvda is set to a positive constant Vvc in order to prevent the denominator of the above equation (2) from becoming zero.

At S230, the CPU determines whether the vehicle 16 is being braked. When the CPU makes a negative determination, it advances the arithmetic control to S280. When the CPU makes a negative determination, it advances the arithmetic control to S240.

At S240, the CPU determines whether the flag Fai is 1, that is, whether the wheel speed of the first wheel is abnormal, as at S10. When the CPU makes an affirmative determination, it advances the arithmetic control to S260. When the CPU makes a negative determination, it advances the arithmetic control to S250.

In S250, the CPU sets the wheel speed Vwb, which is the basis for calculating the estimated vehicle body speed Vvba, to the wheel speed Vwmax of the first wheel. At S260, the CPU sets the wheel speed Vwb to the wheel speed Vwmh of the second wheel.

At S270, the CPU calculates an estimated vehicle body speed Vvba according to the following equation (3) based on the wheel speed Vwb. In the following equation (3), Vvbaf is the previous value of the estimated vehicle body speed Vvba. Kbd is the reduction limiting factor (positive constant). Kbu is a growth limiting factor (a positive constant less than Kbd). In Equation (3) below and Equation (4) below, MED means selecting the middle value among the three values in parentheses.

$$Vvba = MED(Vvbaf + Kbd \cdot \Delta T, Vwb, Vvbaf + Kbu \cdot \Delta T) \quad (3)$$

In S280, the CPU calculates an estimated vehicle speed Vvda according to the following equation (4) based on the wheel speed Vwd, which is the smaller one of the wheel speeds Vwrl and Vwrr of the left and right rear wheels 14RL and 14RR. In the following equation (4), Vvdaf is the previous value of the estimated vehicle speed Vvda. Kdd is the decrease limiting factor (positive constant). Kdu is a growth limiting factor (positive constant less than Kdd).

$$Vvda = MED(Vvdaf + Kdd \cdot \Delta T, Vwd, Vvdaf + Kdu \cdot \Delta T) \quad (4)$$

Operation of the Embodiment

Next, the abnormality determination and the calculation of the estimated vehicle body speed in the above-described embodiment will be described for the case where the vehicle is being braked.

(X) When all Wheel Speeds are Normal

The flag Fai is 0 when all wheel speeds Vwfl, Vwfr, Vwrl and Vwrr are normal. The increase rate of the wheel speed Vwmax of the first wheel does not exceed the increase rate reference value Vwdc. Therefore, negative determinations are made in S10 and S20. In S40, the count value Tai of the timer for abnormality determination is reset to 0, and in S60, a negative determination is made. Therefore, S30 and S70 are not executed, and the flag Fai remains 0.

An affirmative determination is made in S210 and S230, but a negative determination is made in S240. Therefore, in S250, the wheel speed Vwb, which is the basis for calculating the estimated vehicle speed Vvba, is set to the wheel speed Vwmax of the first wheel. Thus, the estimated vehicle speed Vvba is calculated based on the wheel speed Vwmax of the first wheel in S260.

(Y) When the Increase Rate of the Wheel Speed of the First Wheel is Greater than or Equal to the Increase Rate Reference Value If any of the wheel speed sensors 44FL, 44FR, 44RL and 44RR becomes abnormal and the increase rate of the wheel speed Vwmax of the first wheel becomes equal to or greater than the increase rate reference value Vwdc, a negative determination is made in S10, but S20. And in S30, an affirmative determination is made. These determinations are repeated, and S50 is repeatedly executed. Therefore, an affirmative determination is made in S60. At S70, a flag Fai is set to one. Additionally, at S80, a first wheel is identified. An alarm is issued to the effect that the wheel speed of the first wheel is abnormal due to the activation of the alarm device 52.

Figure 4:
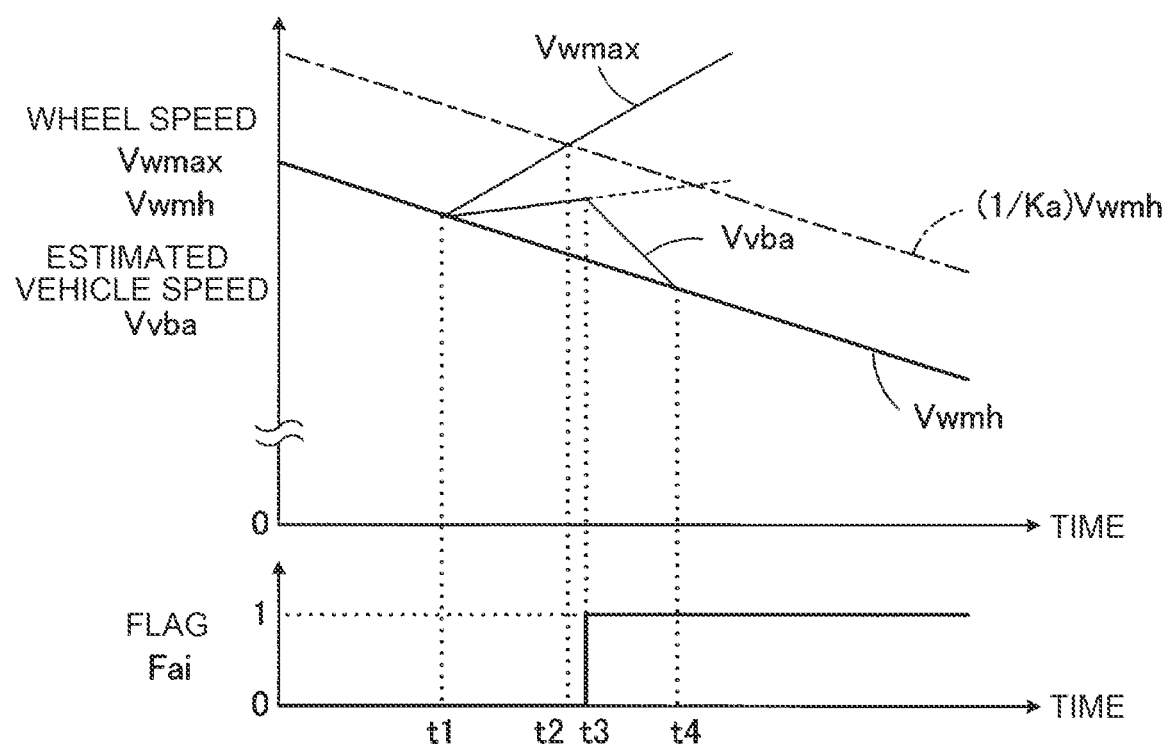
FIG. 4 is a diagram showing an example in which the rate of increase in the wheel speed of the first wheel is greater than or equal to the rate-of-increase reference value in a situation where the wheel speed is gradually reduced by braking.

FIG. 4 shows an example in which the rate of increase in the wheel speed of the first wheel is greater than or equal to the rate-of-increase reference value when the wheel speed Vwi is gradually reduced by braking. As shown in FIG. 4, at time t1, the rate of increase of the wheel speed Vwmax of the first wheel becomes equal to or greater than the rate-of-increase reference value Vwdc. At time t2, the wheel speed Vwmax of the first wheel becomes greater than (1/Ka)*the wheel speed Vwmh of the second wheel. Further, at time t3, the count value Tai of the timer for abnormality determination becomes equal to or greater than the reference value Tac.

After time t1, the determination in S20 becomes a positive determination. After time t2, the determination in S30 becomes a positive determination. At time t3, the determination in S60 becomes affirmative. Therefore, the flag Fai is set to 1 in S70.

Since the flag Fai is 0 until time t3, a negative determination is made in S240. Therefore, from time t1 to time t3, the estimated vehicle body speed Vvba is calculated at S270 based on the wheel speed Vwmax of the first wheel. Along with this, the rate of increase of the estimated vehicle body speed Vvba is limited. Therefore, even if the wheel speed Vwmax of the first wheel suddenly increases, the estimated vehicle body speed Vvba increases moderately. Alternatively, the estimated vehicle body speed Vvba decreases more moderately than the wheel speed Vwmh of the second wheel, which is the normal wheel speed.

After time t3, the determination in S240 becomes affirmative, so the estimated vehicle body speed Vvba is calculated in S260 and S270 based on the wheel speed Vwmh of the second wheel. Along with this, the rate of decrease of estimated vehicle body speed Vvba is limited. Therefore, the estimated vehicle body speed Vvba gradually decreases. Assuming that the estimated vehicle speed Vvba becomes the same as the wheel speed Vwmh of the second wheel at time t4, the estimated vehicle speed Vvba becomes the same as the wheel speed Vwmh of the second wheel after time t4.

(Z) When the wheel speed sensor of the first wheel is replaced

When the wheel speed sensor for the first wheel is replaced with a normal wheel speed sensor, the determinations in S10 and S120 are affirmative while the vehicle 16 is traveling straight ahead without being braked. Since the difference between the wheel speed Vwmax of the first wheel and the wheel speed Vwmh of the second wheel becomes smaller, an affirmative determination is repeatedly made in S130. Therefore, since an affirmative determination is made in S160, the flag Fai is reset to 0 in S170. At S180, the issuance of the warning that the wheel speed of the first wheel is abnormal is terminated.

As can be seen from the above description, according to the embodiment, even if an abnormality such as an abnormality in the electronic circuit of the wheel speed sensor occurs and an abnormality occurs in which the wheel speed Vwmax of the first wheel becomes excessively high, Abnormalities can be determined (S30-S70). Further, when the rate of increase in the wheel speed of the first wheel is less than the rate-of-increase reference value Vwdc (S20), no abnormality determination is made. Therefore, in a situation where the rate of increase in the wheel speed of the first wheel is less than the rate-of-increase reference value, unnecessary abnormality determination is suppressed. It is possible to suppress erroneous determination that the wheel speed of the first wheel is abnormal.

Further, according to the embodiment, when the wheel speed Vwmax of the first wheel is not determined to be abnormal and the vehicle is being braked (S230, S240), the wheel speed of the first wheel is Based on this, an estimated vehicle body speed Vvba of the vehicle is calculated (S250, S270), and anti-skid control is performed as running control using the estimated vehicle body speed. Therefore, when excessive braking slip occurs in wheels other than the first wheel, the braking slip can be reduced by antiskid control.

Further, according to the embodiment, the increase in the estimated vehicle body speed is restricted at the restricted increase rate (S270). Therefore, even when an abnormality such as an abnormality in the electronic circuit of the wheel speed detection device occurs and the wheel speed of the first wheel suddenly increases, it is possible to suppress the estimated vehicle speed increasing rapidly.

Furthermore, according to the embodiment, when it is determined that the wheel speed of the first wheel is abnormal, the estimated vehicle body speed of the vehicle is calculated based on the wheel speed of the second wheel. Decrease in the estimated vehicle body speed is limited by the limit reduction rate (S260, S270). Therefore, even if an abnormality such as an abnormality in the electronic circuit of the wheel speed detection device occurs and the wheel speed of the first wheel suddenly increases, it is possible to suppress the estimated vehicle body speed becoming an excessively high value. Also, when the estimated vehicle speed changes from being calculated based on the wheel speed of the first wheel to being calculated based on the wheel speed of the second wheel, a situation in which the estimated vehicle speed will decrease abruptly is suppressed. This can suppress anti-skid control being performed inappropriately.

Although the present disclosure has been described in detail with respect to specific embodiments, the present disclosure is not limited to the embodiments described above. Various other embodiments are possible within the scope of the present disclosure.

For example, in the above embodiment, in S30, it is determined whether or not the ratio of the wheel speed Vwi of the second wheel to the wheel speed Vwmh of the second wheel exceeds the abnormality determination reference value 1/Ka. However, using ΔVwc as a reference value that increases as the wheel speed Vwmh of the second wheel increases, it may be determined whether the difference ΔVwi between the wheel speed Vwi and the wheel speed Vwmh of the second wheel exceeds the reference value ΔVwc.

Further, in the above-described embodiment, when it is determined that the wheel speed of the first wheel is abnormal and the vehicle is braking (S230, S240), the vehicle speed is calculated based on the wheel speed of the second wheel. Decrease in the estimated vehicle body speed is limited by the limit reduction rate (S260, S270). However, until the estimated vehicle speed is estimated based on the wheel speed of the first wheel and the wheel speed of the second wheel, and the degree of contribution of the wheel speed of the first wheel to the estimated vehicle speed becomes zero, the estimated vehicle speed may be tapered.

Further, in the above-described embodiment, the vehicle travel control is ABS control and TRC control, but may be any travel control known in the art.

What is claimed is:

1. A vehicle travel control device comprising:
   a plurality of wheel speed detection devices that detects a wheel speed of each of a plurality of wheels; and
   a control unit that performs travel control for a vehicle based on the wheel speed detected by the wheel speed detection devices, wherein:
   the control unit is configured to perform an abnormality determination to determine whether a wheel speed of a first wheel having a highest wheel speed is abnormal based on a relationship between the wheel speed of the first wheel and a wheel speed of a second wheel having a second highest wheel speed; and
   the control unit is configured not to perform the abnormality determination when a rate of increase in the wheel speed of the first wheel is less than an increase rate reference value while the vehicle is braked.

2. The vehicle travel control device according to claim 1, wherein the control unit is configured to determine that the wheel speed of the first wheel is abnormal when a ratio of the wheel speed of the first wheel to the wheel speed of the second wheel exceeds an abnormality determination reference value.

3. The vehicle travel control device according to claim 1, wherein the control unit is configured to compute an estimated vehicle body speed of the vehicle based on the wheel speed of the first wheel when it is not determined that the wheel speed of the first wheel is abnormal and while the vehicle is braked, and perform anti-skid control as the travel control using the estimated vehicle body speed.

4. The vehicle travel control device according to claim 3, wherein the control unit is configured to limit an increase in the estimated vehicle body speed at a limit increase rate.

5. The vehicle travel control device according to claim 4, wherein the control unit is configured to compute the estimated vehicle body speed of the vehicle based on the wheel speed of the second wheel when it is determined that the wheel speed of the first wheel is abnormal and while the vehicle is braked, and limit a reduction in the estimated vehicle body speed at a limit reduction rate.

* * * * *